MEANS FOR THE ELECTRIC INDICATION OF UNBALANCE IN ROTORS

Original Filed April 29, 1954 10 Sheets-Sheet 1

MEANS FOR THE ELECTRIC INDICATION OF UNBALANCE IN ROTORS

Original Filed April 29, 1954 10 Sheets-Sheet 2

MEANS FOR THE ELECTRIC INDICATION OF UNBALANCE IN ROTORS

Original Filed April 29, 1954 10 Sheets-Sheet 3

MEANS FOR THE ELECTRIC INDICATION OF UNBALANCE IN ROTORS

Original Filed April 29, 1954 10 Sheets-Sheet 4

MEANS FOR THE ELECTRIC INDICATION OF UNBALANCE IN ROTORS

Original Filed April 29, 1954 10 Sheets-Sheet 5

MEANS FOR THE ELECTRIC INDICATION OF UNBALANCE IN ROTORS

Original Filed April 29, 1954 10 Sheets-Sheet 6

MEANS FOR THE ELECTRIC INDICATION OF UNBALANCE IN ROTORS

Original Filed April 29, 1954 10 Sheets-Sheet 7

MEANS FOR THE ELECTRIC INDICATION OF UNBALANCE IN ROTORS

Original Filed April 29, 1954 10 Sheets-Sheet 8

MEANS FOR THE ELECTRIC INDICATION OF UNBALANCE IN ROTORS

Original Filed April 29, 1954 10 Sheets-Sheet 9

MEANS FOR THE ELECTRIC INDICATION OF UNBALANCE IN ROTORS

Original Filed April 29, 1954 10 Sheets-Sheet 10

United States Patent Office

Re. 24,620
Reissued Mar. 10, 1959

24,620

MEANS FOR THE ELECTRIC INDICATION OF UNBALANCE IN ROTORS

Klaus Federn and Heinrich Hack, Darmstadt, Germany, assignors to Carl Schenck Maschinenfabrik G. m. b. H., Darmstadt, Germany, a corporation of Germany Original No. 2,722,830, dated November 8, 1955, Serial No. 426,424, April 29, 1954. Application for reissue July 8, 1957, Serial No. 670,856

Claims priority, application Germany May 2, 1953

23 Claims. (Cl. 73—463)

Matter enclosed in heavy brackets [ ] appears in the original patent but forms no part of this reissue specification; matter printed in italics indicates the additions made by reissue.

Our invention relates to means for analyzing the unbalance of rotating bodies in predetermined correction planes, by determining such unbalance as to magnitude and angular position in response to the variable values of electric voltages or currents that are supplied from vibration pick-ups and phase-reference transmitters and actuate a wattmeter or other electric measuring instrument.

There are known oscillographic methods that permit a direct reading of magnitude and angular position of unbalance. These methods use either optical means in which a beam of light is reflected by oscillating polygonal mirrors to depict a coordinate diagram on a viewing screen, or they produce a similar diagram by means of a cathode ray oscillograph, the latter method being costly because of the necessary amplifying equipment. Neither method produces a fully stationary picture. They are susceptible to disturbance by spurious electric oscillations and thus fail to present an accurate reading of the values to be determined. Other electric methods for analyzing the unbalance of rotors indicate the unbalance magnitudes by the pointer deflection of a measuring instrument, but require an antecedent adjustment of the angular position of the unbalance by properly changing the rotary setting of the stator in an auxiliary current generator (phase-reference or angle-reference transmitter) or contact interrupter. This involves a considerable and undesirable expenditure in time. In most cases, a correct indication of unbalance can be attained more expediently by resolving the unbalance into two angularly coordinated components, reading these individual components off a pointer instrument and then determining from the component readings the resultant vector with the aid of a polar coordinate diagram.

It is an object of our invention to determine the vectorial unbalance of a rotor by means of indicating instruments while doing away with the subsequent synthesis of the unbalance vector by means of a polar diagram. In other words, my invention makes it possible to directly ascertain the magnitude and angular position of unbalance by means of indicating instruments without the necessity of actuating or adjusting for this purpose any other measuring instrumentality, thus facilitating and expediting the attendant's or observer's activities while securing accurate results.

It is another object of the invention to permit a definite marking of the peripheral point of unbalance location on the rotor being processed or the counter point 180° displaced therefrom, or to place one of these points accurately in front of the unbalance eliminating tool if the machine is directly equipped with such tools, for instance according to U. S. patent application, Serial No. 238,649, filed July 26, 1951, *now Patent 2,810,307*, without the necessity of even reading the values indicated on the screen network of reference lines.

According to our invention, the variable electric magnitudes that define the two coordinate components of a vectorial unbalance are applied to two electric measuring mechanisms, or to two such mechanisms for each correction plane, each mechanism responding only to the one unbalance component assigned thereto; and the two mechanisms are so combined and oriented relative to each other that their respective movable indicator members deflect in mutually intersecting directions to conjointly indicate the resultant vector defined by the measured unbalance components. As a result, the numerical values of magnitude and angular position of the resultant vector can be read off a face of indicia common to both measuring mechanisms; and, according to another feature of my invention, this face carries a polar or other coordinate diagram such as a network of reference lines on which network the indicated data appear in form of a stationary mark.

The measuring mechanisms to be used for this method are preferably of the electrodynamic type. It is further preferable to have the two deflecting indicator members of the respective measuring mechanisms so arranged relative to one another that, when in the respective zero positions, they define together an angle corresponding to the angular relation of the unbalance components, this angle preferably being 90°.

For the practical application of the invention, it is preferred to provide for an optical indication of the resultant vector by means of a spot or line of illumination on a screen having a reference network, the indication being kept stationary as long as it is desired and even after the machine drive of the rotor is stopped.

According to another feature of the invention, the movable indicator members of the measuring mechanisms are held in their respective indicating positions by arresting means consisting preferably of electromagnetic devices.

The common indicating face of the two combined measuring mechanisms may contain any desired indicia, for instance in the form of lines or scale divisions although, for practical purposes, it is often sufficient if only the coordinate lines or curves of a polar diagram are indicated.

The foregoing and other features, set forth with particularity in the claims annexed hereto, as well as further, more specific objects and advantages of the invention will be apparent from the following description of the embodiments illustrated on the drawings, wherein like reference numerals denote corresponding parts throughout the several views. In the drawings—

Fig. 1 is a pictorial presentation of an unbalance indicating machine according to the invention. Its construction and operation is described in detail in connection with the schematic drawing of the same machine represented in Fig. 2.

Figure 2:
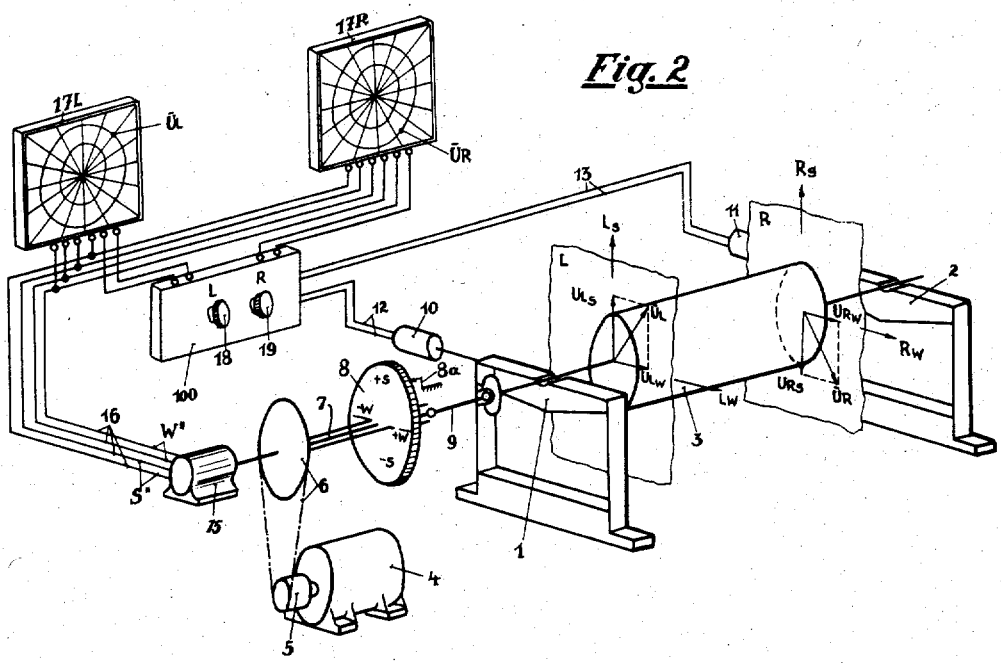
Fig. 2 is a perspective and schematic illustration of an electrodynamic balancing machine with an inserted cylinder-shaped rotor to be analyzed, and shows also the electric devices and their interconnections for measuring and indicating the vectorial unbalance in each of two correction planes.

In Fig. 2, a rotor 3 to be analyzed for unbalance in two correction planes L and R is journalled on oscillatorily supported bearings 1 and 2 of a balancing machine. The rotor 3 is driven by a motor 4 through a slip clutch 5, a chain or belt drive 6, and a transmission shaft 7 that is connected with the shaft of the rotor by means of a Cardanic joint 9. Shaft 7 carries a phase indicator disc 8.

Figure 3:
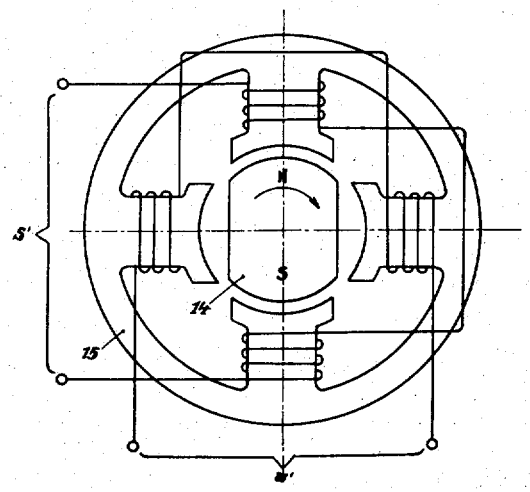
Fig. 3 is a schematic illustration of a phase-reference transmitter forming part of the apparatus shown in Figs. 1 and 2.

Connected with bearings 1 and 2 are respective vibration pick-ups 10 and 11. When these pick-ups respond to vibrations due to unbalance of the rotor, they generate electric currents in pairs of coils for each indicating device. These currents are supplied through cables 12 and 13 to an electric analyzing device 100 including two indicating instruments 17L and 17R. The rotor 14 (Fig. 3) of a phase-reference transmitter 15 is connected with shaft 7 to revolve in synchronism with the rotor being driven. The phase-reference transmitter shown in Fig. 3 consists of an alternating-current generator with a permanent magnet rotor.

The transmitter 15 is connected to the electric analyzing device 100 through leads 16 for operation according to the two-component method. That is, the transmitter 15 is designed for generating two alternating currents in phase-displaced relation to each other, the phase angle preferably being 90°. The two currents are taken from respective terminal pairs s′ and w′, and are supplied by pairs of leads s″ and w″ to the analyzing device. One of the two alternating currents is phased to denote the vertical unbalance direction corresponding to the arrow $L_s$ or $R_s$. The phase of the other alternating current corresponds to the horizontal unbalance direction denoted by the arrow $L_w$ or $R_w$. Both component directions are marked on the phase-reference disc 8 by marks +s, +w, and −s and −w.

Assume that the rotor 3 has a vectorial unbalance $\bar{U}_L$ in the left correction plane L and that it has a vectorial unbalance $\bar{U}_R$ in the right correction plane R. Each of these unbalances can be resolved into two components in rectangular coordinates, namely the components $U_{Ls}$ and $U_{Lw}$, or $U_{Rs}$ and $U_{Rw}$, as indicated in Fig. 2.

The indicating device 17L serves to indicate the vectorial unbalance $\bar{U}_L$ in plane L; and the device 17R serves to indicate the unbalance $\bar{U}_R$ in plane R. Each of devices $17_L$ and $17_R$ comprises two highly sensitive electrodynamic measuring mechanisms of the wattmeter type (see Fig. 7).

Figure 4:
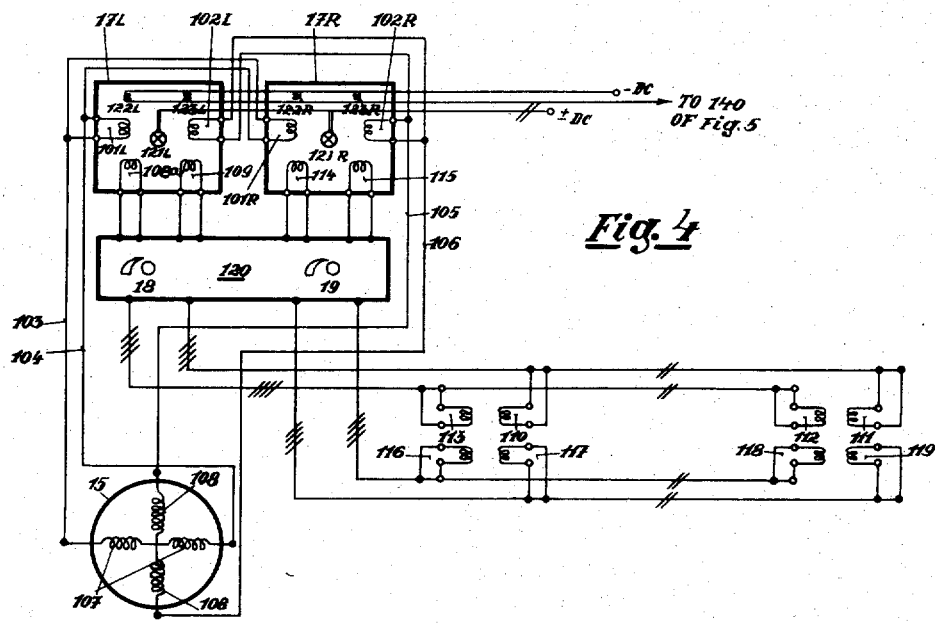
Fig. 4 is a schematic wiring diagram of the electrical measuring circuit of the machine illustrated in Figs. 1 and 2.

Fig. 4 is a schematic diagram of the measuring circuit for the machine according to Fig. 2. The two vector indicating devices 17L and 17R comprises respectively a field coil 101L and 101R for the horizontal and a field coil 102L and 102R respectively for the vertical measuring component. The field coils are connected by pairs of leads 103, 104 and 105, 106 with the winding 107, 108 respectively of the phase angle reference transmitter 15. The moving coils 108a, 109 of the left plane measuring instrument 17L and 114, 115 of the right plane measuring instrument 17R are connected through a control box 120 with the windings 113, 110, and 116, 117 of the vibration pick-up 10 and 112, 111, and 118, 119 of the vibration pick-up 11 (Fig. 2). Each pick-up thus contains four pick-up coils. The separation between correction planes is effected with respect to the left correction plane by a potentiometer 18. The corresponding separation for the right correction plane is effected by a potentiometer 19. Such balancing circuits are well known in the art, and therefore not further described herein.

All measured components are brought to simultaneous indication by the measuring circuit and associated mechanism, as hereinbelow more fully described. Lamps 121L and 121R are for producing indicating dots of light, and the coils 122L and 122R as well as 123L and 123R are magnet coils for temporarily holding the indication mechanism in measurement indicating position even after the disconnection of the drive for revolving the rotor.

Figure 5:
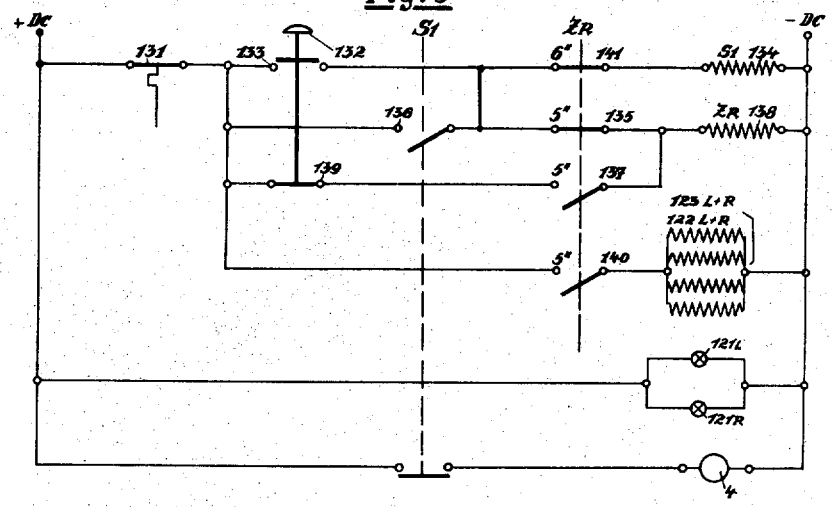
Fig. 5 is a wiring diagram of the control circuit for the machine.

Fig. 5 is a schematic diagram of the electric control circuit for the balancing machine. An automatic thermal relay 131 switches off when the rotor drive is overloaded and then stops the machine. Otherwise, the machine has only one push button switch 132 by means of which the contact 133 can be closed to energize the contactor 134. Contactor 134 switches in the balancing machine motor 4 (Fig. 2). Once energized, contactor 134 holds itself locked in because of the self-actuated normally-open contact 136 in the energization circuit. The coil of the timing relay 138 is simultaneously energized and after about five seconds (5″) opens the contact 135 and closes the contacts 137 and 140. The contact 137 causes the timing mechanism (ZR) to be kept operating, while the opening of contact 135 prevents coil $S_1$ 134 from receiving voltage [ahead] *through contact 137* of the timing mechanism. The contact 140 supplies energization current to the coils 122L, 122R and 123L, 123R for holding the indications. After six seconds (6″), the contact 141 opens. The coil $S_1$ drops out, the drive motor stops and the balancing is terminated. The indications continue to be held, however, because the coil 138 remains energized through contacts 137 and 139. Only when the push button 132 is again actuated, opening contact 139, is the self-holding operation of 138 interrupted so that the timing relay returns to its position of rest, completing a cycle of operation.

Figure 7:
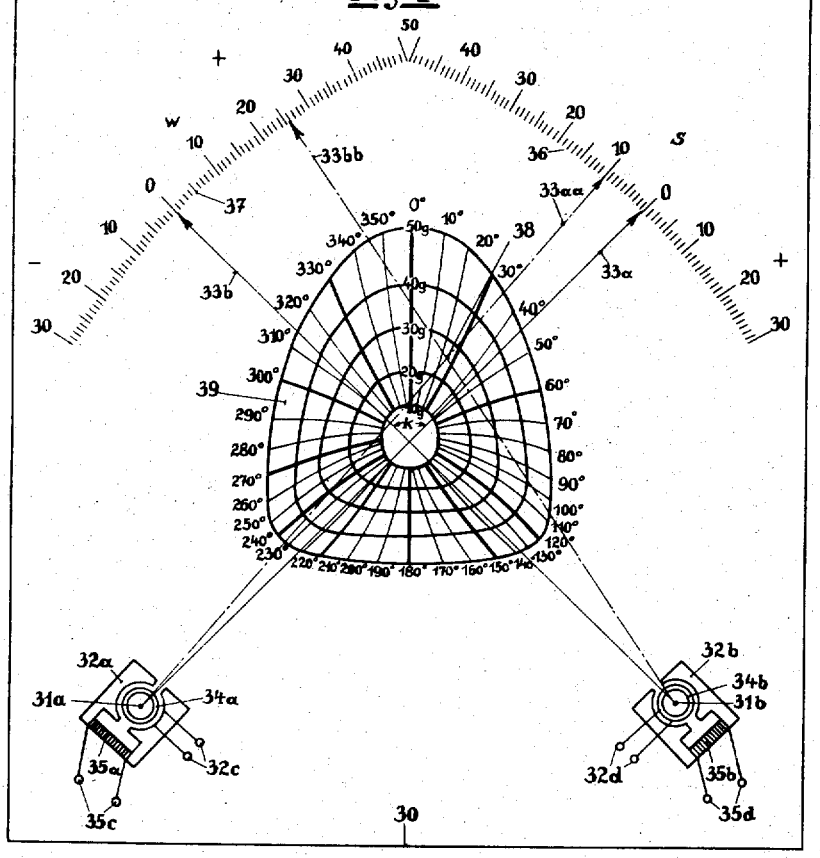
Fig. 7 is explanatory and shows the two coacting electric measuring mechanisms for one of the two indicating devices of Fig. 2 in conjunction with an example of a polar-diagram instrument face common to the two mechanisms.

Fig. 7 shows schematically an example of a double-pointer indication according to the invention as it may be built into each of the above-described devices 17L and 17R. According to Fig. 7, a housing 30 encloses two wattmetric mechanisms 32a and 32b. The moving-coil spindles 31a and 31b of the two mechanisms carry respective pointers 33a and 33b. These pointers, movable independently of each other, are arranged sufficiently close to each other to clearly define a point of intersection when viewed by the observer. When each of the two spindles and pointers is in the zero position, they define together an angle of intersection corresponding to the angular relation of the two unbalance components to be measured, the preferred angle of 90° being shown. This angle, of course, is identical with the phase angle between the two alternating currents of the phase-reference transmitter. The moving coils 34a, 34b of the respective measuring mechanisms are connected to respective pairs of terminals 32c and 32d at which they are energized, through the potentiometer devices 18 or 19 of the control box 120 (Fig. 4), by the vibration-responsive current generated by the pick-up 11 or 12. Each pick-up has a permanent magnet in the field of which coils are moved in accordance with the vibrations to be responded to. The stationary field coils 35a and 35b of the two wattmetric mechanisms are energized by a selected one of the alternating currents taken from terminals s′ or w′ of the phase transmitter 15 (Fig. 2) through the terminals 35c and 35d (Fig. 7) respectively.

During a measuring run, the pointers 33a and 33b deflect from the zero position in mutually crossing directions. For instance, if the two pointers assume the positions 33aa and 33bb shown in dot-and-dash lines, then the point of [interseection] *intersection* 38 indicates the magnitude and direction of the resultant unbalance vector relative to the zero point of the instrument face. A network of reference lines 39 is provided to present a numerical indication of the measured magnitude. In the example illustrated in Fig. 7, the diagram network indicates for point 38 an unbalance magnitude of 28 grams at an angular position of 25°. The diagram lines for 0°, 45°, 135°, 180°, 225° and 315° are linear in the illustrated instrument, while the other lines of the diagram are composed of circular arc portions. The lines of equal unbalance magnitude, calibrated, for instance, in grams, are curves of approximately circle to heart shape. The curves for the decades, 10 grams to 50 grams, are entered in Fig. 7.

In addition to the above-mentioned diagram lines, the indicating face may also be provided with two scales 36 and 37. These scales indicate the individual component amounts of the unbalance. For instance, when the two pointers occupy the positions 33aa and 33bb, they indicate an unbalance component of −10 grams on scale 36 for measuring mechanism 32a, and an unbalance component of +26 grams on scale 37 of measuring mechanism 32b. The unbalance component −10 grams relates to a component measuring direction of 45°, and the unbalance component +26 grams to the component direction 315°.

Figure 8:
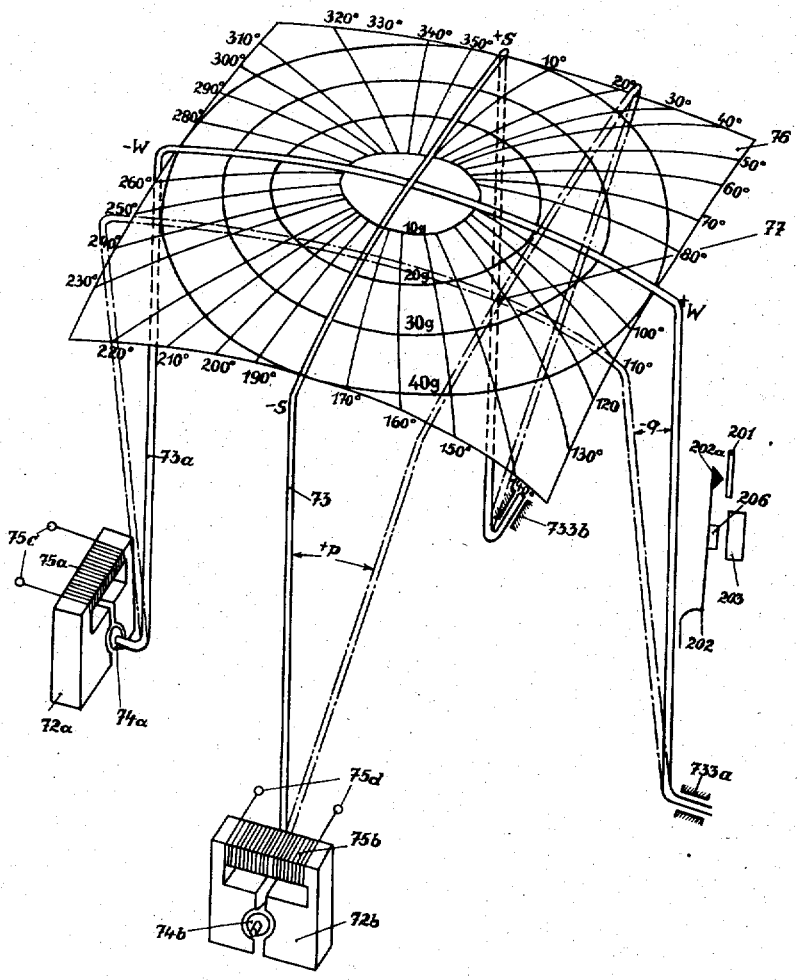
Fig. 8 shows in a schematic perspective view a modified design of two combined measuring mechanisms applicable in an unbalance analyzing system that may otherwise be similar to that of Fig. 2.

A modified embodiment of indicating mechanism is shown in Fig. 8. Measuring mechanisms 72a and 72b are provided having indicating pointers 73a, [73b] *73* designed as stirrup-shaped structures that are guided in counter bearings 733a and 733b respectively. The stirrup structures may consist of thin luminescent tubes. The middle portions of the stirrups move in front of a transparent screen 76 marked with a polar coordinate system. The transparent screen 76 may be curved as a portion of a spherical surface. The axes of rotation of the stirrup structures are directed relative to one another in accordance with the angular relation of the unbalance components to be measured, the angle being 90° in the illustrated apparatus. The radial portions of the stirrup structures below the screen 76 are curved concentrically to the spherical screen surface so that the indicating portions of the structures haves always a minimum spacing from each other, thus presenting a sharply defined point of intersection.

The two measuring mechanisms 72a and 72b are of the wattmetric type. Each of their respective moving coils 74a and 74b is firmly joined with the axial portions of the stirrup structures and is movable in the field of a stationary field coil 75a or 75b. The terminals 75c and 75d of the stationary field coils are connected to the pairs w″ and s″ of leads 16 coming from the phase-reference transmitter 15 (Fig. 2).

The pointer positions shown in Fig. 8 by full lines correspond to the zero position of the measuring mechanisms. When effecting an indication in response to an unbalance of the rotor being analyzed, both stirrup pointers deflect from zero. For instance, the pointer 73a may deflect an angular amount −q and the pointer [73b] *73* may deflect an angular amount +p as shown. The point of intersection 77 of the two deflected pointers directly indicates to the observer the magnitude of the unbalance as 28 grams and also the angular position of the unbalance, this angular position being 132°.

Arresting or holding devices of the electromagnetic type are provided at the pointers or at the pointer portions guided in the counter bearings 733a and 733b respectively to maintain a given indication. Such a holding device is shown schematically in Fig. 8 only for the limb of pointer 73a above the counter bearing 733a. A resilient member 202 such as a leaf spring has one end attached to the pointer. The leaf spring carries an armature 206 near its freely movable end and within the active range of an electromagnet 203. The magnet has a curved shape corresponding to the path of movement of the pointer. When the pointer has reached a measuring position and has come to rest in that position, the electromagnet is automatically excited and attracts the armature [106] *206*, thus locking the pointer in the deflected position. Such an arresting device, of course, is also provided for the pointer [73b] *73*. Thus, the indication remains available for any desired period of time after completion of the measuring operation proper, i. e. after stopping the drive of the balancing machine and after energizing or disconnecting the electric balance-measuring circuits. As hereinabove described in connection with the circuit diagrams of Figs. 4 and 5, the electromagnets (203, for example) are energized by the coils 122L, 122R, 123L and 123R. The spring elements 202 may be provided with a pointer 202a movable in front of a scale 201 to indicate the angle of pointer deflection.

The invention may also be applied in a simple manner to devices operating with a beam of light as an indicator. Such devices may comprise rotatable mirrors to effect an optical indication on a translucent viewing screen. With such devices it is also possible to operate with only one spot of light by successively reflecting a single beam of light along its path from the light source to the viewing screen by two measuring mechanisms in two different directions which preferably correspond to the respective coordinate directions of the unbalance components to be indicated.

Figure 9:
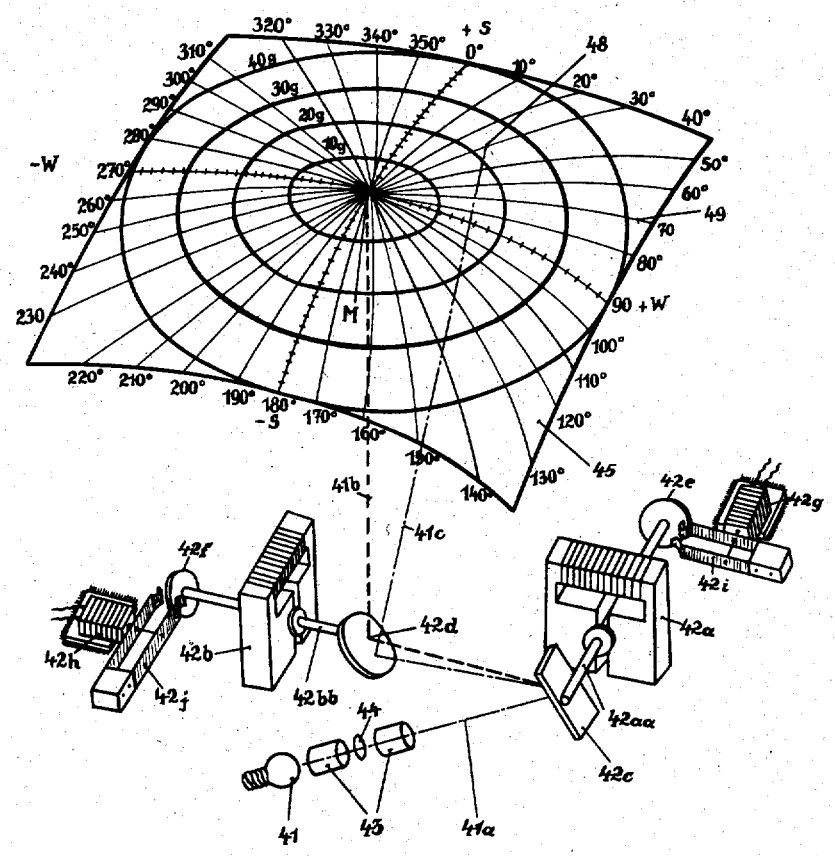
Fig. 9 represents schematically an optically operating modification of the combined measuring mechanisms, while Figs. 9a and 9b relate to details of the same modification.

Fig. 9 shows schematically an embodiment of such an optical apparatus. The beam of light 41a issuing from a light source 41 passes through an optical lens system 43 with a diaphragm 44 onto a plane mirror 42c and thence to a second plane mirror 42d from which the beam impinges upon a translucent viewing screen 45. The mirrors 42c and 42d are mounted on the rotary spindles 42aa and 42bb of respective wattmetric measuring mechanisms 42a and 42b that in all other respects are similar to the corresponding mechanisms shown in Fig. 7. The angle defined by the two rotating spindles 42aa and 42bb is equal to the angle between the two coordinae measuring components, equal in this case to 90°. The transparent viewing screen 42 may be curved in two dimensions to provide for a sharp image of the spot of light at any point on the screen surface.

When the two measuring mechanisms or mirrors are in their zero position, the beam of light, successively reflected by the mirrors 42c and 42d, impinges upon the screen at the zero point of the network of polar coordinates 49. During the operation of the apparatus, the light beam 41a is deflected in two directions depending upon the respective positions of rotation of the two mirrors 42c and 42d. For instance, the deflection may be such that the beam occupies the position 41c to produce an illuminated spot at point 48 indicating an unbalance of the magnitude 24 grams in a direction of 30°, these data being directly readable off the coordinate network 49. The lines +s, −s and +w, −w correspond to the component directions as indicated on the phase reference disc 8 in Fig. 2. The component direction +s in this apparatus coincides with the angular position 0°.

Figure 9A:
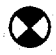
Figure 9B:
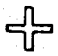

The spot of light 48 is not circular but preferably appears on the screen 45 to indicate a sharply defined point. For that reason, the wedge-shaped indicator spot customarily used for light-beam instruments is modified for use with the present invention, as is exemplified by Fig. 9a, so as to appear as a mark with a subdivision in quadrants, or according to Fig. 9b, where it appears as a cross-shaped mark. If the two bars of the cross-shaped mark are designed to extend across the entire viewing surface of screen 49 when the measuring mechanisms are at zero position, then the values of the unbalance components can be read off on the scale division of the lines +s to −s, and +w to −w for any position of reflection that the beam of light assumes during the balancing operation. The rotating spindles 42aa and 42bb are provided with circular clutch plates 42e and 42f, cooperative with electromagnets 42g, 42h respectively, adapted, when energized, to hold the spindles in indicating position. Thus, when the electromagnets are energized by means of the circuit described in connection with Figs. 4 and 5, the ends of the electromagnet armatures 42i, 42j are moved into frictional engagement with their respective clutch discs to prevent return movement.

Figure 11:
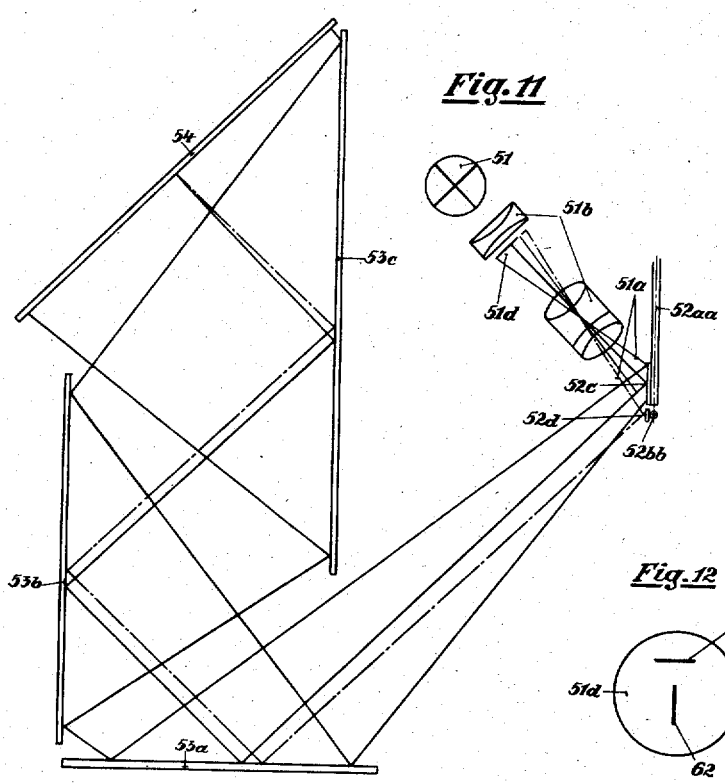
Fig. 11 illustrates another modification of the measuring mechanisms also operating on optical principles.
Figure 12:
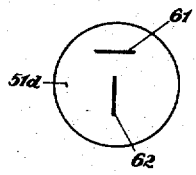
Fig. 12 is an explanatory diagram relating to the embodiment of Fig. 11.

Fig. 11 shows another modification of optically transmitting the measuring values onto a viewing screen. The two measuring mechanisms for deflecting the beam of light are not illustrated in Fig. 11 as they may be identical with or similar to those shown in Fig. 9, described above. The two revolvable spindles [53a] *52aa* and [53b] *52bb* of the respective measuring mechanism carry mirrors 52c and 52d whereby the angular positions of the mirrors are changed in accordance with the measuring values being indicated. As in the embodiment of Fig. 9, the two spindles are arranged at an angle of 90° with respect to one another. A light source 51 throws two beams of light 51a through a lens system 51b and a diaphragm 51d with two slots (see also Fig. 12) onto the mirrors 52c and 52d respectively. The two slots 61 and 62 of diaphragm 51d (Fig. 12) form with each other the same angle as the spindles of the measuring mechanisms, that is, the angle of 90°. The light beams are reflected over any desired number of directing mirrors 53a, 53b, 53c, upon the conveniently located transparent viewing screen 54. The screen may be provided with a network of reference lines in form of a polar coordinate system, as described previously. On the screen 54, the two beams of light produce two mutually intersecting illuminated strips.

Figure 6:
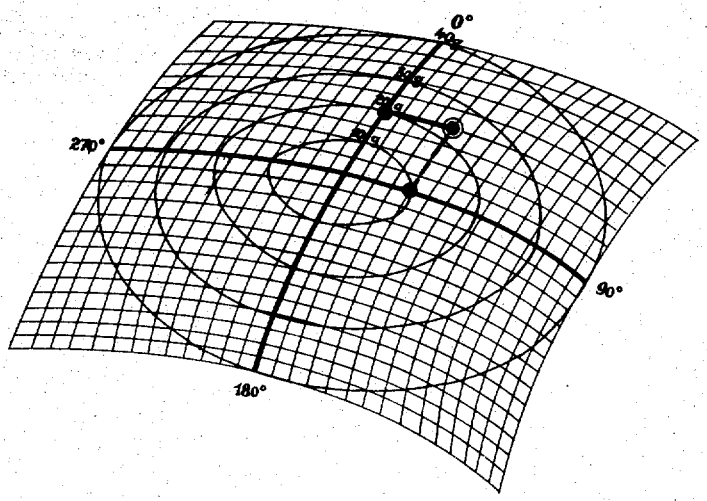
Fig. 6 illustrates an example of a pattern of polar coordinate lines that may be used as an indicating face.
Figure 10:
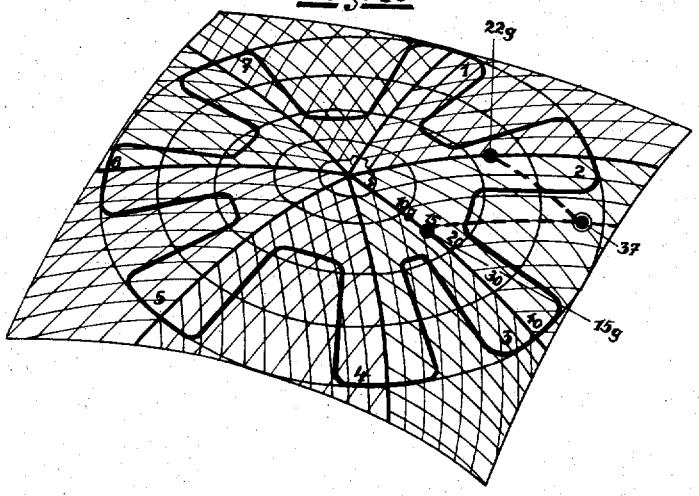
Fig. 10 illustrates an example of a polar-coordinate face on which is imprinted the outline of a seven-lobe fan rotor to be balanced.

Whereas Fig. 6 illustrates a polar coordinate indicating screen in simplest form, it is further possible to provide a system of reference lines superimposed upon an image of the type of rotor being analyzed in correlation to a given correction plane, so that the intersection point of the reference lines directly indicates on the image of the rotor not only the magnitude but also the location of the unbalance. Thus, in the seven-lobe fan rotor illustrated in Fig. 10, the unbalance vector is indicated by a spot of illumination 37 from which the component portions of the neighboring fan lobes can be read off on the network of reference lines at points 27g and 15g. Such a pictorial representation is especially advantageous for the balancing of a series of similar rotors. It is further possible to pass a photographically sensitized paper over the viewing screen for recording the measured values.

The above-described arresting or holding of the indication, properly adapted to the design of the indicating elements, may also be employed in conjunction with the described optical devices; that is, the arresting means may cooperate with the respective mirrors to hold them in the position reached when deflected according to the magnitudes being indicated.

Figure 13A:
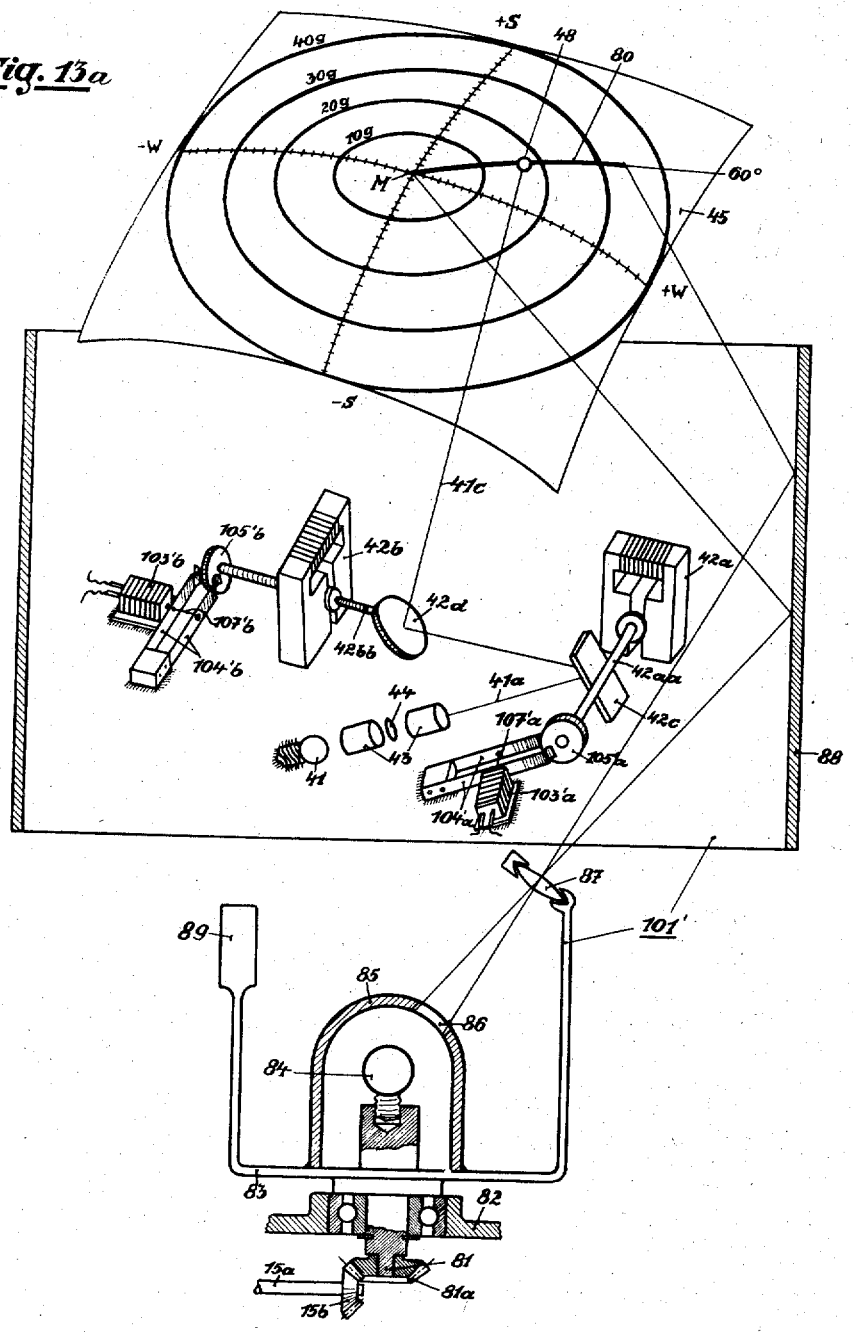
Figs. 13a and 13b illustrate modifications of the indicating system shown in Fig. 9 including means to locate the rotor being balanced so that it is in proper angular position for correction operations.
Figure 14:
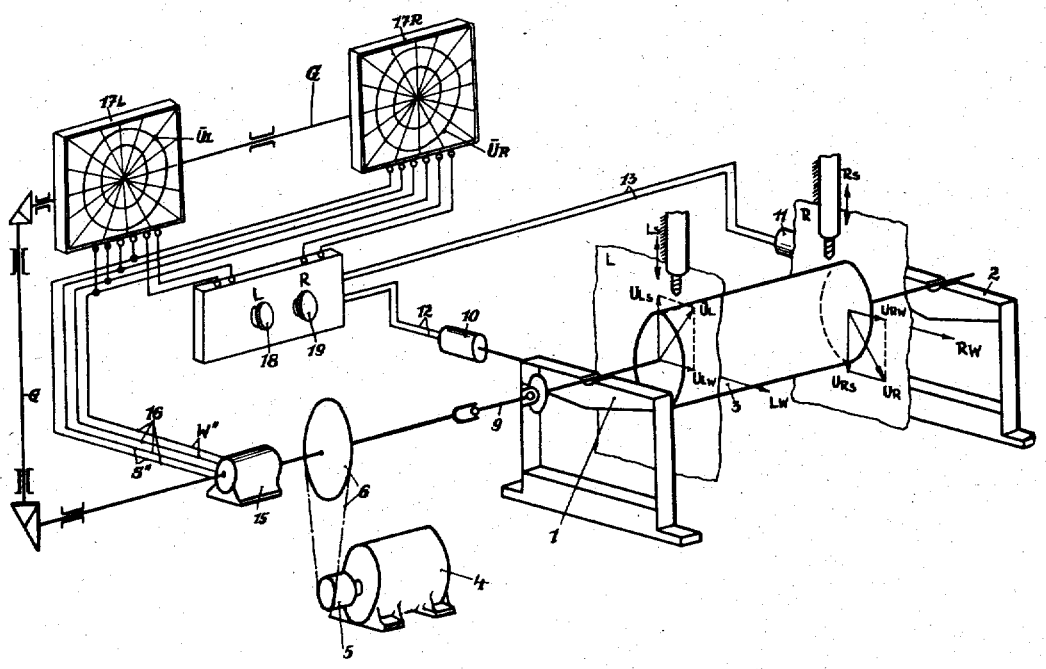
Fig. 14 illustrates schematically the complete system incorporating the embodiments of Figs. 13a and 13b.

Fig. 13a illustrates a vector measuring instrument similar to Fig. 9 which, in conjunction with the apparatus schematically illustrated in Fig. 14, not only indicates the unbalance magnitude but also immediately locates the unbalance position on the rotor to be balanced. After the unbalance magnitude is measured, the indicating light spot 48 on the screen 45 remains stationary, even after disconnection of the rotor drive, by means of the indication holding mechanism described above. The rotor 3 is turned in the bearings 1 and 2 manually so that a radial strip of light 80 is moved about the center point M of the screen 45 until it is intersected by the indication point 48. For this purpose, an angular-position indicating device is built into each of the measuring instruments 17L and 17R. The indicating device comprises a pivot pin 81 which extends out of the instrument housing and carries a bevel gear. The pivot pin is driven from the shaft of the phase-angle transmitter 15, through a gear transmission mechanism G (Fig. 14) in synchronism with the rotor 3. The pivot pin 81 carries a holder 83 for a source of light 84, and further a covering diaphragm 85 with a diaphragm slit 86 and a collector lens 87. The rays of light issuing from source 84 pass through a diaphragm slit of the lens 87 and cast a strip of light upon the reflecting inner surface of a circular cylinder 88 whose center axis passes through the center point M. The cylindrical mirror reflects the strip of light directly upon the screen 45. The slit diaphragm 86 could alternatively be a fine wire to project a dark strip instead of a bright strip on the screen.

For determining the unbalance position, the rotor 3 and thus the light 80 is turned until the strip passes through the indicated light point 48. The position then occupied by the rotor being tested in the machine can be utilized directly for marking thereon the locations where the unbalance-removing machine operation is to be performed. When the balancing machine is equipped with unbalance-removing tools according to the U. S. patent application, Serial No. 238,649, the position now occupied by the rotor is correct for having the unbalance-eliminating tools, for instance drills (see Fig. 14) operate upon the rotor. It is then merely necessary to feed the drills against the rotor. At the points where the drills then abut the rotor, a positionally and quadrantally correct elimination of material is effected without requiring the reading of angular degrees on screen 45 and without requiring an adjustment of a disc 8 (Fig. 2) in accordance with such angle readings. Consequently, the disc 8 as well as the angular subdivision of screen 45 are eliminated by the provision of the optical system shown in Fig. 13a.

Assume that the measuring instrument indicates an angular position of 60° as is shown in the example of Fig. 13a for the purpose of explanation. It follows from this indication that the unbalance is located perpendicularly above the rotor axis and can be eliminated at that point which occupies the top position on the rotor when the angular division indicative of exactly the same angle of 60° is located on disc 8 in front of the stationary pointer 8a (see Fig. 2). It is obvious that the same result must obtain if the disc 8 were stationary and the pointer 8a were turned together with the rotor 3 until the pointer registered with the 60° mark on the disc 8. The latter method of operation is analogous to that used in the apparatus according to Figs. 13a and 14 except that the pointer 8a is built into each of the two vector measuring instruments as a light or shadow strip.

Figure 13B:
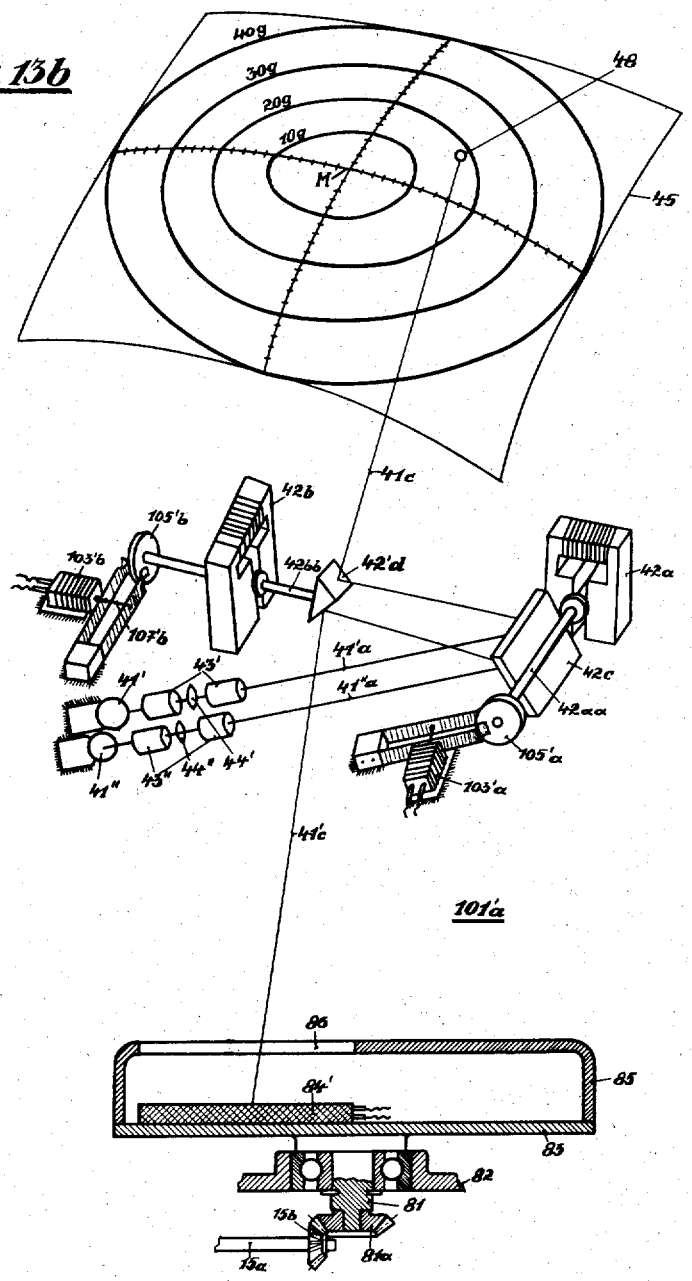

Figs. 13b shows an embodiment of an optical apparatus similar to Fig. 13a. As far as parts of the new instrument are like parts of Fig. 13a they are denoted by the same reference numbers. The apparatus in accordance with Fig. 13b allows issuance of electric pulses in order to stop automatically the slowly rotating body 3 being balanced when it is in its proper angular position for correction operation. On holder 83 rotating with the body to be balanced as described, instead of a light source 84 a photoelectrical element 84' is installed. And on the wattmeter axis 42bb an equiangular prismatic mirror 42'd is mounted. Two sets of optical means are provided instead of one in Fig. 13a. They are transmitting light beams 41'a and 41''a being deflected by mirror 42c in the direction of the prismatic mirror. From this mirror the indicating beam of light 41c is directed against screen 45, and the controlling beam of light 41'c is directed against the rotating holder 83. Beam 41'c enters the cover 85 through slit 86 when body 3 is in the right position for correction operation. At the same moment the element 84' issues electrical impulses which may be utilized for different controlling steps as e. g. stopping the rotor at this position and locking the machine bearings and the rotor on said bearings to prevent rotational movement during correction operation, and eventually even starting said operation.

Figure 1:
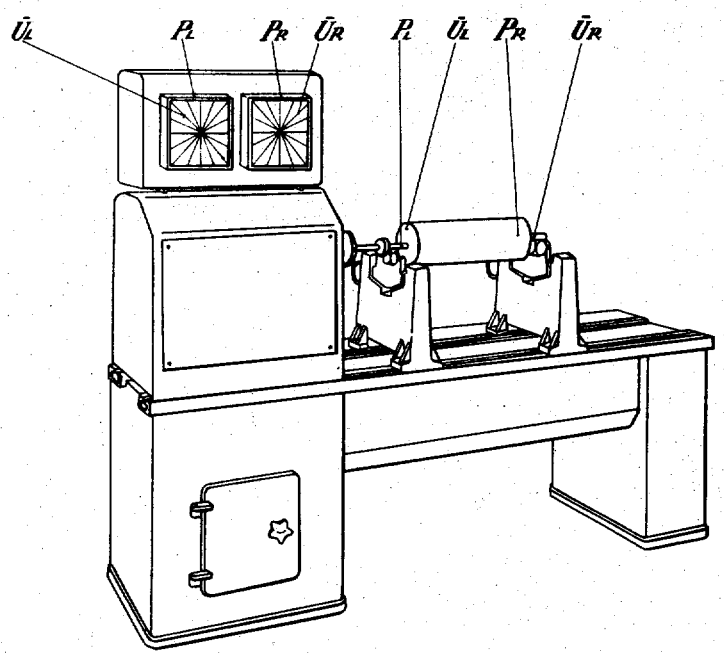
Fig. 1 is a perspective view of the unbalance indicating machine according to the invention, showing a rotor being balanced in place.
Figure 15:
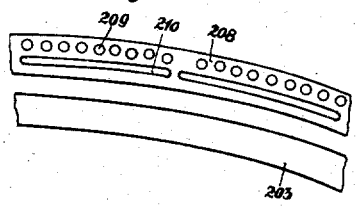
Fig. 15 is a partial view of a rotary switch mechanism used [in conjunction with Fig. 14] for automatic control of drill presses and the like to automatically make unbalance correction.
Figure 16:
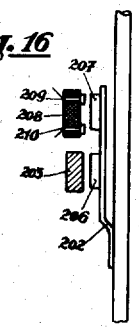
Fig. 16 is an end view of the mechanism shown in Fig. 15.

In the apparatus according to the invention, the deflected pointers of the measuring mechanisms may be utilized for controlling the issuance of electric pulses to thereby control a machining operation needed to eliminate the analyzed unbalance of the rotor under observation. For this purpose, the spring member 202 according to Fig. 8, aside from having the metallic armature element 206 as illustrated in Figs. 15 and 16, may be provided with an electric contact bridge 207 which, upon operation of the electromagnet 203, is forced against an arcuate bank of units and tens contacts 209 and 210, respectively, carried upon an arcuate strip of insulation 208. The contact bridge then closes a circuit with a *selected one of the bank contacts, and the selected circuit thus established controls the subsequent unbalance-correcting machining operation as is more fully disclosed in Patents No. 2,682,046 and No. 2,810,307. Thus, the selected contact 208 or 209, when engaged by contact bridge 207, may perform the same function as the closing of a selected push-button switch 54, 55 according to Fig. 1 of Patent No. 2,682,046 or according to Fig. 2 of Patent No. 2,810,307.* [selected one of the bank contacts, and the circuit thus established is nullified by current pulses that may be supplied to steeping switches suitable for controlling the unbalance-removing machining operation. Since such circuits are fully described in the U. S. patent application, Serial No. 238,649, referred to above, it is deemed unnecessary to further describe them here.]

We claim:

1. Apparatus for measuring unbalance in rotors, comprising means to provide a voltage proportional to the amount of unbalance at a plane transverse to the axis of rotation of the rotor, synchronous means cooperative with said rotor to provide a pair of out-of-phase A.-C. voltages, a pair of multiplying measuring devices each having an indicator mechanism providing a path of indication and each having a pair of circuits for jointly controlling said mechanism, means connecting one of said two out-of-phase voltages with one circuit of one of said pairs, means connecting the other of said out-of-phase voltages with one circuit of the other pair, means connecting said unbalance voltage with the other circuit of each of said pairs, said mechanisms having their respective paths of indication crossing each other, when at null-indicating positions, at an angle substantially equal to the phase-difference angle of said out-of-phase voltages, and polar coordinate indicating means common to said two mechanisms and having its origin aligned with the point of crossing of said paths at null positions thereof for indicating the vectorial quantity of said unbalance.

2. Apparatus for measuring unbalance in rotors, comprising means to provide a voltage proportional to the amount of unbalance at a plane transverse to the axis of rotation of the rotor, synchronous means cooperative with said rotor to provide a pair of out-of-phase A.-C. voltages, a pair of wattmeter instruments, each having indicator mechanism providing a path of indication and a pair of coils, means connecting one each of said out-of-phase A.-C. voltages with one coil each of said pairs of coils, means connecting said unbalance voltage with the other of each of said pairs of coils, said wattmeters being so disposed that the paths of indication of said indicator mechanisms, when at null-indicating positions, cross at an angle substantially equal to the angular value of said out-of-phase voltages, and polar coordinate indicating means having its origin aligned with the point of crossing of said paths at null positions thereof and having gradient lines indicative of the vectorial quantity of said unbalance.

3. In apparatus as defined in claim 1, each of said indicator mechanisms comprising a locking device for holding said mechanism in indicating position.

4. In apparatus as defined in claim 1, said indicating means comprising a polar-coordinately subdivided indicating surface, and each of said indicator mechanisms comprising a deflectable pointer member having a portion extending across said surface in juxtaposed relation to said portion of the other pointer member, whereby said vectorial quantity is determined by the crossing point of said two pointer portions when said pointers are deflected.

5. In apparatus for measuring unbalance in rotors as defined in claim 1, each of said indicating mechanisms comprising a shaft, a mirror fixed to said shaft, and one of a pair of mutually perpendicular planar light beams, one beam each being reflected by one each of said mirrors, said beams being reflected on said polar coordinate indicating means to produce mutually perpendicular linear indications thereon.

6. Unbalance measuring apparatus as defined in claim [2] 5 comprising a plurality of auxiliary reflecting mirrors for reflecting said light beams between said shaft mirrors and said polar coordinate indicating means.

7. Apparatus for measuring unbalance in rotors comprising means to provide a voltage proportional to the amount of unbalance in a plane transverse to the axis of rotation of the rotor, synchronous means cooperative with said rotor to provide a pair of out-of-phase A.-C. voltages, a pair of wattmeter instruments, each having elongated moving indicator means and a pair of coils, means connecting one each of said out-of-phase A.-C. voltages with one coil each of said pairs of coils, means connecting said unbalance voltage with the other of each of said pairs of coils, said wattmeters being so disposed that their elongated indicator means, when at null-indicating positions, lie in adjacent, substantially parallel planes and cross at an angle substantially equal to the angular value of said out-of-phase voltages, and polar coordinate indicating means having its origin aligned with the point of crossing of said elongated indicators at null positions thereof and having gradient lines indicative of the vectorial quantity of said unbalance.

8. Apparatus as defined in claim 7, wherein said pair of A.-C. voltages are 90° out of phase.

9. Apparatus as defined in claim 7, including indicating scales for each of said elongated indicator means for scalar indication of the coordinate components of the vectorial unbalance being measured.

10. Apparatus as defined in claim 7, wherein said A.-C. voltages are 90° out of phase, wherein said moving indicators are provided with indicating portions continuously movable at right angles with respect to one another, and wherein said coordinate indicating means comprises substantially concentric circular gradient loops for indicating magnitude.

11. Apparatus as defined in claim 7, including arresting means to hold said indicator means in indicating position.

[12. Apparatus as defined in claim 11, including electrical contact means associated with each of said indicator means for performing an interrelated sequence of a plurality of discrete switching operations the number of which is dependent upon the value of indication of the respective indicator means.]

13. Apparatus for measuring unbalance in rotors, comprising means to provide a voltage proportional to the amount of unbalance at a plane transverse to the axis of rotation of the rotor, synchronous means cooperative with said rotor to provide a pair of A.-C. voltages 90° out of phase with one another, a pair of wattmeter instruments each having moving indicator means and a pair of coils, means connecting one each of said out-of-phase A.-C. voltages with one coil each of said pairs of coils, means connecting said unbalance voltage with the other of each of said pairs of coils, said moving indicator means comprising shafts arranged to have their axes of rotation at right angles to one another and in spaced relation, a pair of reflecting mirrors, one fixed to each of said shafts, a source providing a beam of light, and a polar coordinate indicating screen, said source, mirrors and screen being so arranged that at null-indicating position of said shafts, said beam of light is reflected by said mirrors to cast said beam of light on the origin point of said indicating screen.

14. Apparatus as defined in claim 13, wherein an image of the rotor cross section being balanced is superimposed on said indicating screen, and wherein the magnitude-indicating coordinate system gradient lines are arranged to resolve the measured vectorial unbalance quantity along predetermined radii of said rotor image.

15. Apparatus as defined in claim 14, including holding means to clamp said shafts in indicating position.

16. Apparatus as defined in claim 15, including optical means to cast an angular position indicating line image on said screen, mechanism for rotating said line image about the origin of said polar coordinate indicating screen, and means interconnecting said mechanism for synchronous rotation with the rotor being balanced, whereby, upon rotation of said rotor until said line intersects the vectorial indication of unbalance of said rotor, the rotor can be positioned for corrective operation by mechanism associated in predetermined spacial relation with respect to said balancing machine.

17. Apparatus for measuring unbalance in rotors, comprising means to provide a voltage proportion to the amount of unbalance at a plane transverse to the axis of rotation of the rotor, synchronous means cooperative with said rotor to provide a pair of A.-C. voltages 90° out of phase with one another, a pair of wattmeter instruments each having moving indicator means and a pair of coils, means connecting one each of said out-of-phase A.-C. voltages with one coil each of said pairs of coils, means connecting said unbalance voltage with the other of each of said pairs of coils, said moving indicator means comprising first and second shafts arranged to have their axes of rotation at right angles to one another and in spaced relation, a first reflecting mirror fixed to said first shaft, a second reflecting mirror fixed to said second shaft, a first source providing a beam of light, a polar coordinate indicating screen, said first source, first and second mirrors and screen being so arranged that at null-indicating position of said shafts, said first beam of light is reflected sequentially by said first and second mirrors to cast said first beam of light on the origin point of said indicating screen, holding means to clamp said shafts in indicating position, a third mirror fixed to said second shaft, a second source providing a second beam of light, said second source and third mirror being so arranged with respect to said first mirror that said second beam of light maintains an angular position about the origin of said indicating screen fixed with respect to said first beam, means synchronously rotatable with the rotor being balanced, and a radial sensing device on said rotatable means, said second beam of light being directed upon said rotatable means, whereby said rotor can be positioned in predetermined angular position relative its angular position of unbalance.

18. The invention as defined in claim 17 wherein said rotatable means comprises a turntable member coaxially disposed with respect to the central axis of said indicating screen and wherein said sensing device comprises a photoelectric element shielded from said second beam by a mask having a radial slit.

*19. Apparatus as defined in claim 7, comprising arresting means for holding said respective indicator means in indicating position, and two electric control devices each having a movable member connected with one of said indicator means to move together therewith and having a bank of serially arranged contacts selectively actuable by said movable contact depending upon the indicating position in which said indication is arrested by said arresting means, whereby said control devices perform selective switching operations dependent upon the value of indication of the respective indicator means.*

*20. Apparatus for measuring unbalance in rotors, comprising means to provide a voltage proportional to the amount of unbalance in a plane transverse to the axis of rotation of the rotor, synchronous means cooperative with said rotor to provide a pair of out-of-phase A.-C. voltages, a pair of multiplying measuring devices correlated to the respective voltages of said voltage pair, each device having a moving mechanism and each having two circuits for jointly controlling said mechanism, means connecting one of said two out-of-phase voltages with one circuit of one of said devices, means connecting the other of said out-of-phase voltages with one circuit of the other device, means connecting said unbalance voltage with the other circuit of each of said devices and control means for effecting a control in dependence upon the measured amounts of unbalance, said control means comprising two electric contact devices each having a movable member connected with one of said respective moving mechanism, each of said contact devices having sequential contacts distributed along the path of said movable member and selectively engageable thereby for closing respective control circuits depending upon the moving distance of said respective mechanisms, whereby the two control circuits selected by said respective contact devices are indicative of the required unbalance correction in respective rotor-axial planes having the same mutual angular relationship as said two out-of-phase voltages.*

*21. Apparatus for measuring unbalance in rotors, comprising means to provide a voltage proportional to the amount of unbalance in a plane transverse to the axis of rotation of the rotor, synchronous means cooperative with said rotor to provide a pair of out-of-phase A.-C. voltages, a pair of wattmetric instruments correlated to the respective voltages of said voltage pair, each instrument having a moving mechanism and a pair of coils for jointly controlling said mechanism, circuit means connecting one of said two out-of-phase voltages with one coil of one of said pairs, circuit means connecting the other out-of-phase voltage with one coil of said other pair, means connecting said unbalance voltage with each of the other coils of said pairs, arresting means for holding said two moving mechanisms at the positions reached by them when said pairs of coils are excited, and control means for effecting a control in dependence upon the measured amounts of unbalance, said control means comprising two electric contact devices each having a movable member connected with one of said respective moving mechanisms, each of said contact devices having sequential contacts along the path of said movable member and selectively actuable thereby for closing respective circuits indicative of the moving distance of said respec-*

*tive mechanisms, whereby the closure of said respective contact devices are indicative of the required unbalance correction in respective axial planes of the same angular relationship as said two out-of-phase voltages.*

*22. Apparatus according to claim 21, comprising a drive for rotating the rotor to be corrected, a start control device connected with said drive for starting said drive, a timing device connected with and controlled by said start control device and having a timing period sufficient for said moving mechanisms to complete their respective operations, said timing device having control means operative upon elapse of said timing period and connected with said drive and with said arresting means for stopping said drive while maintaining said mechanisms arrested.*

*23. Apparatus according to claim 21, comprising a drive for rotating the rotor to be corrected, an electric control circuit connected with said drive and having switch means for controlling the operation of said drive, a timing device connected in said control circuit to be controlled in dependence upon operation of said switch, and an energizing circuit connecting said timing device with said energizing circuit for subsequently releasing means a timed interval after start of said drive whereby said mechanisms are arrested and thereafter retained in said positions, and a release control member connected with said energizing circuit for subsequently releasing said arresting means.*

*24. Apparatus for measuring unbalance in rotors, comprising means to provide a voltage proportional to the amount of unbalance in a plane transverse to the axis of rotation of the rotor, synchronous means cooperative with said rotor to provide a pair of out-of-phase A.-C. voltages, a pair of multiplying measuring devices correlated to the respective voltages of said voltage pair, each device having a moving mechanism and each having a pair of circuits for jointly controlling said mechanism, means connecting one of said two out-of-phase voltages with one circuit of one of said devices, means connecting the other of said out-of-phase voltages with one circuit of the other device, means connecting said unbalance-proportional voltage with the other circuit of each of said devices; control means for effecting a control in dependence upon the measured amounts of unbalance, said control means comprising two electric selector switch means connected with said respective mechanisms to close selected control circuits depending upon the movements of said respective mechanisms; a drive for rotating the rotor to be corrected, a start control device connected with said drive, for starting said drive, a timing device connected with and controlled by said start control device and having a timing period sufficient for said two mechanisms to complete their respective measuring movements, arresting means engageable with said respective mechanisms for arresting them in the positions reached at the end of said movements, said timing device having control means operative upon elapse of said timing period and connected with said drive and with said arresting means for stopping said drive and controlling said arresting means to arrest said respective mechanisms.*

References Cited in the file of this patent or the original patent

UNITED STATES PATENTS

| | | |
|---|---|---|
| 2,165,024 | Baker | July 4, 1939 |
| 2,331,733 | Senger | Oct. 12, 1943 |
| 2,467,412 | Wathen | Apr. 19, 1949 |